Feb. 6, 1951 E. H. ARMSTRONG 2,540,643

FREQUENCY-MODULATED CARRIER SIGNAL RECEIVER

Filed Jan. 12, 1940 2 Sheets-Sheet 1

INVENTOR
Edwin H. Armstrong
BY Moses & Nolte
ATTORNEYS

Feb. 6, 1951 E. H. ARMSTRONG 2,540,643

FREQUENCY-MODULATED CARRIER SIGNAL RECEIVER

Filed Jan. 12, 1940 2 Sheets-Sheet 2

INVENTOR
Edwin H. Armstrong
BY Moses + Nolte
ATTORNEYS

Patented Feb. 6, 1951 2,540,643

UNITED STATES PATENT OFFICE 2,540,643

FREQUENCY-MODULATED CARRIER SIGNAL RECEIVER

Edwin H. Armstrong, New York, N. Y.

Application January 12, 1940, Serial No. 313,499

8 Claims. (Cl. 250—20)

Figure 1:
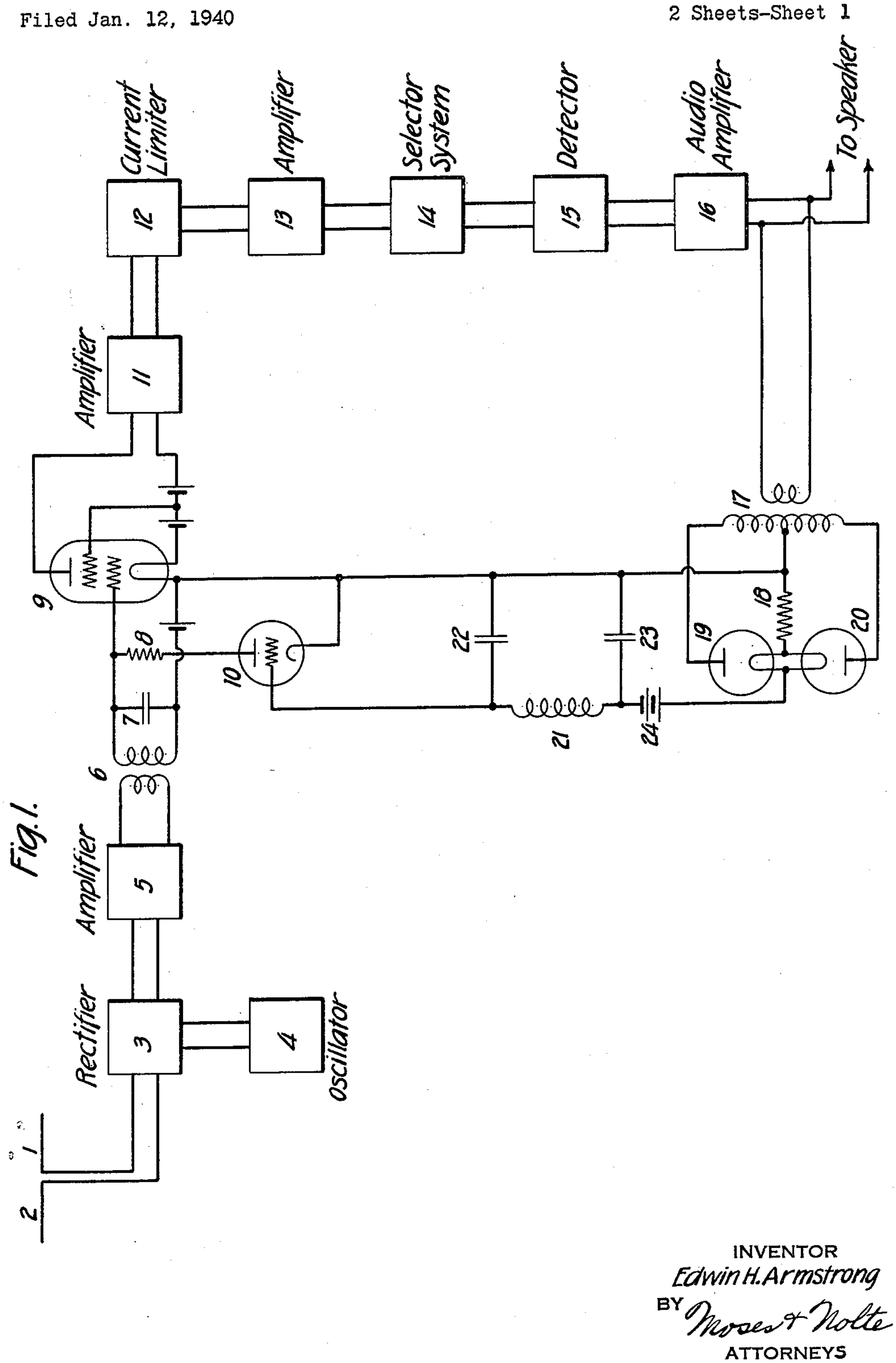
Figures 2, 3, 4:
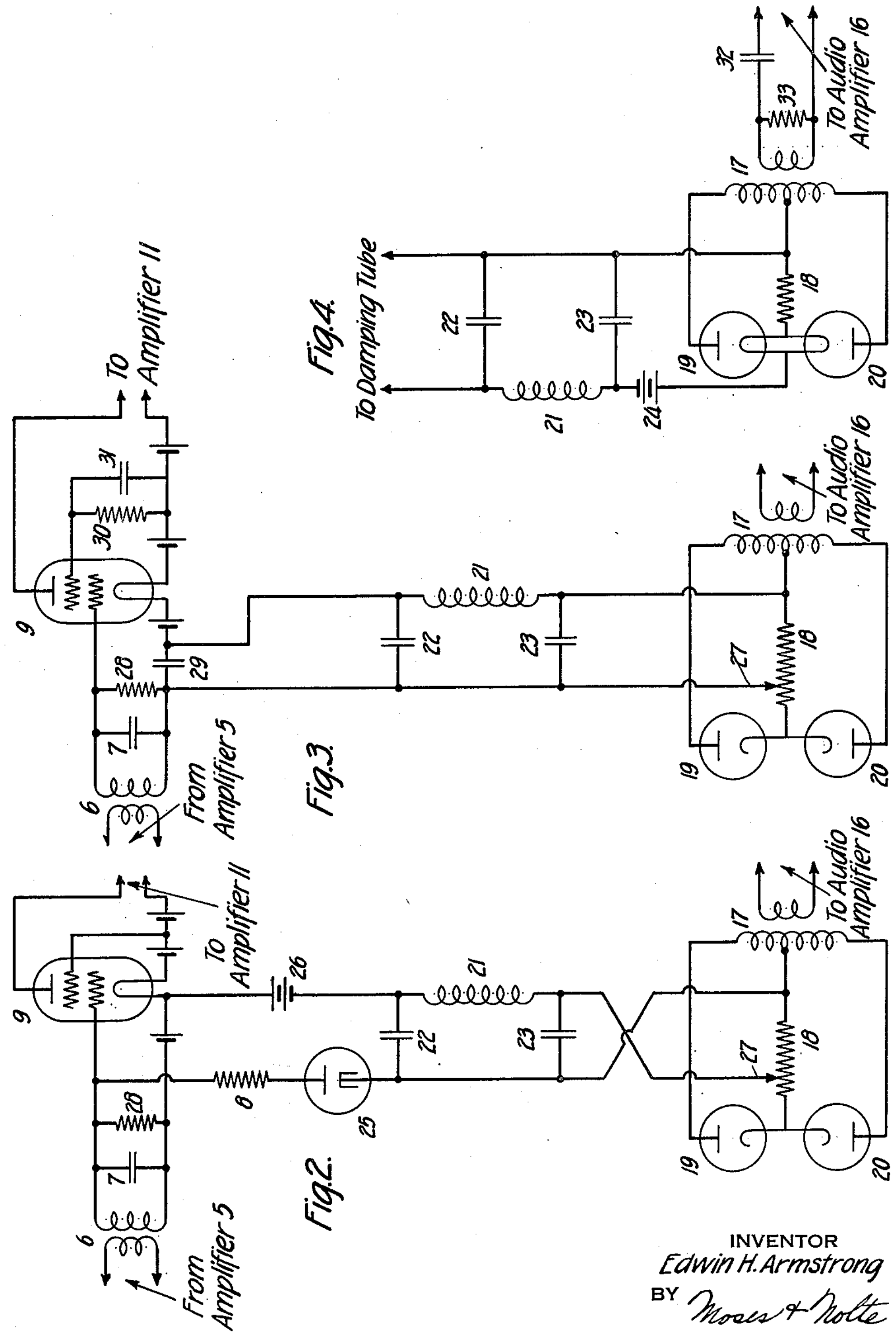

This invention relates to improvements in receivers for frequency modulated waves in radio signaling, particularly for use in the reception of the wide band type of transmission described in my U. S. Patent #1,941,069.

With this system of signaling the most troublesome type of interference is that caused by the ignition system of motor vehicles, and in my U. S. Patents No. 2,116,501 and No. 2,116,502 there are described methods of reception which are particularly adapted to the suppression of this type of interference.

It is the purpose of this specification to describe improvements in these methods which result in substantial betterment in the signal to noise ratio that can be obtained under conditions of severe interference for ignition systems or, in fact, of any impulse type of disturbance.

Fig. I illustrates the general principle of the invention, and Figs. II, III and IV illustrate more detailed arrangements of the means employed, corresponding circuit elements being indicated by the same reference numerals.

The invention will be understood from the following explanation. In my U. S. Patent No. 2,116,502 there is described a method of reenforcing the frequencies lying in the center of the band of frequencies used for transmission with respect to the other frequencies of the band, so that, when the transmitter is unmodulated or modulated only slightly, the midfrequency or the midfrequency and those frequencies lying adjacent to it are passed through the receiver to the current limiter at greater relative amplitudes than the frequencies throughout the remainder of the band. As a consequence of this during periods of low modulation, the effects of impulse excitation are much reduced. The reenforcement of the midfrequencies may be accomplished in a number of ways, but perhaps the simplest method, as explained in my U. S. Patent No. 2,116,502, is the use of a tuned circuit adjusted to be resonant to the midfrequency of the band and sufficiently damped by resistance to pass in some degree the desired band. It is, however, not possible with this simple arrangement to carry the reenforcing process out beyond a certain point, as transient oscillations set up in the tuned circuit as the frequency of the incoming signal is varied widely results in distortion.

It is the purpose of the present invention to remedy this difficulty by automatically varying the damping of the selective means used for the reenforcing process, so that when the frequency of the transmitted wave is widely modulated the damping of the selective means will be increased. It is a further object of the invention to cause the damping of the circuit to be increased with the rate of change of the frequency of the received signal, since the distortion produced when the selective circuit used in the reenforcing process is too lightly damped depends not only on the extent of the change of frequency but also on its rate.

The operation of the invention may best be understood by reference to the figures which form a part of this specification. Referring now to Fig. I, the antenna is represented by 1, 2, connected to a rectifier or converter 3. 4 represents an oscillator for heterodyning the frequency of the received current down to some intermediate value in the ordinary superheterodyne method of reception. 5 represents an intermediate frequency amplifier arranged to pass the desired band of frequencies, and 6, 7 a tuned circuit tuned to the midfrequency of this band. 8 represents a damping resistance, 9 an amplifier for the intermediate frequency, and 10 a vacuum tube whose plate circuit is connected in series with the resistance 8 across the tuned circuit 6, 7. Further reference to the function of this tube will be made later. The output of the amplifier 9 is supplied to another amplifier 11 whose output in turn is connected to a current limiter 12. The remainder of the receiver 13, 14, 15, 16 is arranged in the usual manner for frequency modulation reception, 13 representing an amplifier, 14 a device for converting frequency changes into amplitude changes, 15 a detector, and 16 an audio amplifier. Connected to the output of the audio amplifier or to any convenient point of the amplifier is a transformer 17 whose secondary is connected to a pair of rectifiers 19, 20. 18 represents a resistance through which the rectified audio current flows. 21, 22 and 23 represent a filter for removing the audio currents from the output of the rectifier leaving only the direct current component. 24 represents a source of bias voltage for the grid of the vacuum tube 10.

Referring now to the vacuum tube 10, it will be observed that the resistance 8 and the plate resistance of this tube are connected in series across the tuned circuit 6, 7. The resistance of the tube 10 depends among other things upon the grid potential and hence by varying this voltage it is possible to control the damping of the circuit 6, 7.

In accordance with this invention, the damping of the circuit is controlled in a manner depending on the extent of the variation of the received frequency by rectifying the audio frequency currents resulting from the deviations of frequency and applying the direct current component of the voltage to the control of the grid potential of the tube 10. It will be observed from the diagram that the greater the amplitude of the audio current the greater the rectified voltage, and hence the more positive the grid potential of the tube 10 becomes. This results in a lower plate resistance more effectually damping the circuit 6, 7 thus causing a corresponding increase in the width of the band of frequencies passed thereby. By proper choice of the resistance 8, the characteristics of the tube 10 and its biasing voltage 24 and the level of the intermediate frequency voltage developed across the circuit 6, 7 any desired characteristic of the damping with respect to the variation in frequency of the received signal may be obtained. As the level of the intermediate frequency voltage is of some importance, it will usually be found desirable to make use of an automatic amplification control.

Fig. II shows a modification of the arrangement for damping the tuned circuit. In this figure a simple diode 25 replaces the tube 10, and the rectified voltage from the output of 19, 20 is applied directly in series with the cathode current of the diode, a battery 26 being included in the diode circuit. The amount of the rectified control voltage applied to the diode may be adjusted by means of the adjustable contact 27, as shown. An additional damping resistance 28 is included, but in all other respects the operation of the system is the same as that of Fig. I.

Fig. III illustrates a modification of the arrangement of Fig. II in which the grid of the amplifying tube connected to the tuned circuit is used as the means of damping the circuit. This is accomplished as shown in the diagram by applying the control voltage across a condenser 29 and causing the rectified audio voltage to make the grid of the amplifying tube 9 positive, thereby drawing grid current and damping the circuit. To prevent excessive current through the tube 9 a dropping resistance 30 shunted by a condenser 31 may be included in the screen circuit. In all other respects the operation is similar to that of Figure II.

As has already been stated, the disturbance caused by the free oscillation set up in the tuned circuit depends not only on the extent of the deviation of frequency but also on its rate. It has been found advantageous to make the additional damping introduced in the circuit dependent not only on the extent of the deviation, but also on its rate of variation. This can be readily accomplished by the arrangement indicated in Fig. IV, which illustrates the rectifying part of the damping control system. By the use of a series capacity 32 whose reactance is high compared to the impedance of the primary circuit of the transformer 17, the rectified current and hence the damping effect can be made substantially proportional to the frequency as well as to the amplitude at which the transmitted wave is caused to swing. This results in a substantial improvement in the operation of the system. In the example illustrated, a resistor 33 is connected across the primary of transformer 17.

In order to minimize the number of adjustments it is desirable to include an automatic volume control of the amount of intermediate frequency amplification prior to the selective circuit.

I have described what I believe to be the best embodiments of my invention. I do not wish, however, to be confined to the embodiments shown, but what I desire to cover by Letters Patent is set forth in the appended claims.

I claim:

1. A radio receiving system for frequency modulated signal currents comprising, in combination, a resonant circuit adapted to pass a band of frequency modulated currents, damping means connected across the terminals of said resonant circuit, a frequency modulation detector for demodulating the frequency modulated currents, and means responsive to the demodulated currents for automatically controlling the damping effect of said damping means in accordance with the extent of the frequency variations of the received signal while maintaining the resonant frequency of said circuit substantially constant.

2. A radio receiving system for frequency modulated signal currents comprising, in combination, a resonant circuit adapted to pass a band of frequency modulated currents, a vacuum tube having its plate connected to one terminal of said circuit and its cathode to the other terminal thereof, and means for automatically decreasing the plate resistance of said tube in accordance with an increase in the range of frequency variations of the received signal and in accordance with the rate of increase of such range.

3. A radio receiving system for frequency modulated signal currents comprising, in combination, a resonant circuit adapted to pass a band of frequency modulated currents, damping means connected across the terminals of said resonant circuit, and means for automatically controlling the damping effect of said damping means in accordance with the rate of change of the frequency variations of the received signal and also with the extent of said frequency variations.

4. A radio receiving system as set forth in claim 3 in which the means for controlling the damping effect comprises a filter device whose reactance decreases as the frequency increases.

5. A frequency-modulated carrier-signal receiver comprising, a carrier-frequency signal-translating channel including a band-pass selector, means for adjusting said band-pass selector to control the width of the pass band thereof, a frequency-modulation detector coupled to said channel, means responsive to the detected signal amplitude for deriving a control effect, and means for utilizing said control effect to control said adjusting means to adjust the pass band of said selector directly in accordance with the degree of modulation of a received carrier signal.

6. In a frequency modulation receiver of the superheterodyne type including a signal collector, a converter, at least one intermediate frequency amplifier, an amplitude modulation limiter, means for deriving modulation voltage from the amplified frequency-modulated, intermediate frequency voltage; the improvement which comprises means operatively associated with said intermediate frequency amplifier for adjusting the effective pass band width of said amplifier, means for deriving from the said modulation voltage a unidirectional control voltage whose magnitude is substantially directly proportional both to the modulation voltage amplitude and rate of change in modulation voltage amplitude, and means utilizing said control voltage for regulating the effectiveness of said band width adjusting means.

7. A frequency-modulated carrier-signal receiver comprising, a carrier-frequency signal-translating channel including a band-pass selector, means including an electron discharge tube for adjusting said band pass selector to control the width of the pass band thereof, a frequency-modulation detector coupled to said channel, rectifier means responsive both to the magnitude of the detected signal amplitude and the rate of change in its magnitude for deriving a control-bias voltage and means for utilizing said control-bias voltage to vary the impedance of said discharge tube in such a manner as to adjust the pass band of said selector directly in accordance with the degree of modulation and rate of change of modulation of the received carrier signal.

8. A frequency-modulated carrier-signal receiver comprising, a carrier-frequency signal-translating channel including a band-pass selector, means for adjusting said band-pass selector to control the width of the pass band thereof, a frequency-modulation detector coupled to said channel, rectifier means responsive both to the detected signal amplitude and rate of change in amplitude for deriving a control-bias voltage, and means for utilizing said control-bias voltage to control said adjusting means to adjust the pass band of said selector directly in accordance both with the degree of modulation of a received carrier signal and the rate of change in modulation.

EDWIN H. ARMSTRONG.

REFERENCES CITED

The following references are of record in the file of this patent:

UNITED STATES PATENTS

| Number | Name | Date |
|---|---|---|
| 2,058,565 | Case | Oct. 27, 1936 |
| 2,083,232 | Koch | June 8, 1937 |
| 2,150,044 | Wheeler | Mar. 27, 1939 |
| 2,152,515 | Wheeler | Mar. 28, 1939 |
| 2,170,202 | Kuffmuller | Aug. 22, 1939 |
| 2,170,475 | Hahn | Aug. 22, 1939 |